(12) United States Patent
Zweber

(10) Patent No.: US 8,316,582 B2
(45) Date of Patent: Nov. 27, 2012

(54) PLANT MANAGEMENT DEVICE AND METHOD

(76) Inventor: Philip T. Zweber, Faribault, MN (US)

( * ) Notice: Subject to any disclaimer, the term of this patent is extended or adjusted under 35 U.S.C. 154(b) by 581 days.

(21) Appl. No.: 12/584,541

(22) Filed: Sep. 8, 2009

(65) Prior Publication Data

US 2010/0058659 A1    Mar. 11, 2010

Related U.S. Application Data

(60) Provisional application No. 61/191,312, filed on Sep. 8, 2008.

(51) Int. Cl.
*A01G 9/02* (2006.01)
(52) U.S. Cl. ............................................................ 47/67
(58) Field of Classification Search .................... 47/67
See application file for complete search history.

(56) References Cited

U.S. PATENT DOCUMENTS

| | | | | |
|---|---|---|---|---|
| 4,078,625 A | * | 3/1978 | Loeb | 177/233 |
| 4,454,831 A | * | 6/1984 | Gallo | 116/200 |
| 5,802,764 A | * | 9/1998 | Nucci | 47/67 |
| 6,564,509 B1 | * | 5/2003 | Zahner | 47/67 |

FOREIGN PATENT DOCUMENTS

GB           2268593 A   *   1/1994

* cited by examiner

*Primary Examiner* — Frank T Palo
(74) *Attorney, Agent, or Firm* — Antonio Papageorgiou; Ostrow Kaufman LLP

(57) ABSTRACT

A small and compact, easy-to-use soil moisture management device is disclosed that is economical to produce, efficient to use, has a scientific measurement system and is easy for the user to read the moisture needs of a plant in a hanging container. The device includes a housing that is attached at one end to hardware for supporting the device and a hanging basket that contains a plant in soil and moisture in varying amounts in the soil. The device also includes a moving member that is biased by a spring against the gravitational pull on the hanging basket, plant, soil and moisture. The spring and a portion of the moving member is contained in the housing. The moving member also contains visual indicators of the position of the moving member against the bias provided by the spring to indicate the amount of moisture in the soil. In the method, an eyebolt that supports the hanging basket, soil, plant and moisture is capable of moving against a bias against the gravitational pull on the hanging basket, soil, plant and variable amount of moisture and, by the movement of the eyebolt, visually indicating the position of the eyebolt against the bias so that a first amount of moisture in the soil produces a first position of the eyebolt and a second amount of moisture produces a second position of the eyebolt.

24 Claims, 8 Drawing Sheets

CHART OF COMPRESSION SPRING USE RELATIONSHIPS

|  | BASKET SIZE | DRY | WET |
|---|---|---|---|
|  | 10" | 4 lbs. | 8.3 lbs. |
| LIGHT SPRING | 11" | 4.5 lbs. | 8.9 lbs. |
|  | 12" | 5.7 lbs. | 13.7 lbs. |
|  | 14" TAN | 8 lbs. | 18.2 lbs |
| HEAVY SPRING | 14" FIBER | 8 lbs. | 18 lbs. |
|  | 16" MOSS | 9.3 lbs. | 22 lbs. |

PLANT MANAGEMENT DEVICE AND METHOD

CROSS-REFERENCE TO RELATED APPLICATIONS

The application listed below is the only application related to this application. This application claims benefit of the earlier filing date under 35 USC 119(e) of provisional application No. 61/191,312 filed on Sep. 8, 2008.

BACKGROUND OF THE INVENTION

1. Field of Invention

This application relates generally to a device for healthy management of plants potted in hanging containers and more specifically to controlling water and light relationships critical to maintaining plant health.

2. Prior Art

After the long months of winter, nature begins to bloom in the spring of each year. Consumers are eager to return to their retail garden center to buy plants and ornamentally decorate the interiors and primarily the exteriors of their homes, lawns and patios.

Retail garden centers have found it to be more and more popular to offer plants for sale in hanging baskets. Consumers are immediately gratified to have a mature plant, already in flowering bloom, to purchase and take home as an ornament for their place of residence. Typically consumers install hanging brackets, eye bolts from the eve of their house, poles in their yard and other hardware to hang the plant in a prominent attractive location.

After a few days the newly hung plants require watering and repositioning to maintain their health. As much as plants are loved there are also many obstacles to the plants health. Such as, much of the population work day jobs and are not available during the day to tend to the plant. Also, many elderly persons have physical infirmities which diminish their capacity to take care of a plant on a consistently regular schedule. Often times, many persons of all ages are just not fully aware of the subtle changes that take place with the plant relative to the plant's need for water and light.

The majority of persons do not water their plants on a consistently timed basis or in accord with changing weather cycles. The majority of persons water their plants by using a drench and drain method, when they are available to do the watering. They may feel secure they are meeting the plants watering needs. Also, rarely does the consumer unhook their plant and reposition the plant basket in the sun. This repositioning usually, for one reason or another, is far too difficult to do. As a result the plant begins to grow in a lopsided fashion and soil shrinks back from the inside of the container, due to the inconsistent watering, thus stressing the plant further.

It is a far too common scenario for a homeowner to leave the house in the morning believing their hanging plants to be healthy and fully watered. Then, returning home, at night, to find their plants wilted or at worst dead beyond recovery and their residence looking unsightly. Often times the consumer will return to the garden center in the belief there was something wrong with the plant they purchased. This is not a pleasant situation for the garden center employee to explain, to the consumer, how the consumer has unknowingly stressed the plant.

Attempts have been made to invent watering indicators. Many drench and drain advocates recommend the use of cheap soil moisture meters. It is highly debatable whether they are any better than poking your finger into the soil. Many times the construction is flimsy and highly susceptible to damage. Meters available for consumers are not professional instruments. Perhaps more important is the fact that they do not really measure moisture. They measure ionic reaction of the salts in the water. These meters will also give a false reading when the soil is very dry and has a high salt content. The meter can inaccurately read this as moist soil. Mechanical meter attempts, as well, have not been successful in resolving the issues that retailers and consumers have, today, with their hanging plants. Previously invented indicators are large, bulky and of no practical use. They are not visually pleasing to the eye and detract from the beauty of the plant. They are unscientific in their approach to measurement and do not work with the standardized hanging baskets produced by manufacturers today and sold in garden centers. If they are used at all, the plant basket hangs at such a low level the effect is not aesthetically pleasing. Often times this creates an unsafe condition where homeowners hit their head on the low hanging plant basket. As well, most do not effectively warn the consumer to water the plant. The reason being, warning indicators often contained inside of an apparatus are hard to view and often times get covered by dirt splashed back from watering a hanging plant. Watering indicators do not address the light needs of a plant in a hanging basket.

From the above, it can be seen what is needed is a device that is small and compact, easy-to-use, economical to produce, efficient to use, having a scientific measurement system, easy for the user to read and addresses the light needs of a plant in a hanging container.

SUMMARY OF THE INVENTION

The present invention is a device and method for healthy management of plants potted in hanging containers and more specifically a device and method for controlling water and light relationships critical to maintaining plant health. The device includes a housing that is attached at one end to hardware for supporting the device and a hanging basket that contains a plant in soil and moisture in varying amounts in the soil. The device also includes a moving member that is biased by a spring against the gravitational pull on the hanging basket, plant, soil and moisture. The spring and a portion of the moving member is contained in the housing. The moving member also contains visual indicators of the position of the moving member against the bias provided by the spring to indicate the amount of moisture in the soil. In the method, an eyebolt that supports the hanging basket, soil, plant and moisture is capable of moving against a bias against the gravitational pull on the hanging basket, soil, plant and variable amount of moisture and, by the movement of the eyebolt, visually indicating the position of the eyebolt against the bias so that a first amount of moisture in the soil produces a first position of the eyebolt and a second amount of moisture produces a second position of the eyebolt.

There are many objects of the present invention in its various embodiments that may be addressed individually or in combinations and permutations. Each embodiment may address one or several of the following objectives.

An object of this invention in one embodiment or variant of the invention is to provide a device which is small and compact in size.

Another object of this invention in one embodiment or variant of the invention is to provide a device which is easy to use and safe.

Another object of this invention in one embodiment or variant of the invention is to provide a device which is visually non-obtrusive to the eye.

Another object of this invention in one embodiment or variant of the invention is to provide a device to maintain the health of a potted plant in a hanging container.

Another object of this invention in one embodiment or variant of the invention is to provide a device with an indicator that can be clearly observed and read.

Another object of this invention in one embodiment or variant of the invention is to provide a device with longevity free from mechanical breakdown.

Another object of this invention in one embodiment or variant of the invention is to provide a device usable with common container sizes.

Another object of this invention in one embodiment or variant of the invention is to provide a device that is rotationally adjustable.

Another object of this invention in one embodiment or variant of the invention is to provide a device that assures against plant wilt.

These and other objects and advantages of the invention will be clear in view of the following description of the invention including the associated drawings.

BRIEF DESCRIPTION OF THE DRAWINGS

The invention will be described hereafter in detail with particular reference to the drawings. Throughout this description, like elements, in whatever embodiment described, refer to common elements wherever referred to and referenced by the same reference number. The characteristics, attributes, functions, interrelations ascribed to a particular element in one location apply to that element when referred to by the same reference number in another location unless specifically stated otherwise. All Figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength and similar requirements will likewise be within the skill of the art after the following description has been read and understood.

DETAILED DESCRIPTION

Figure 1:
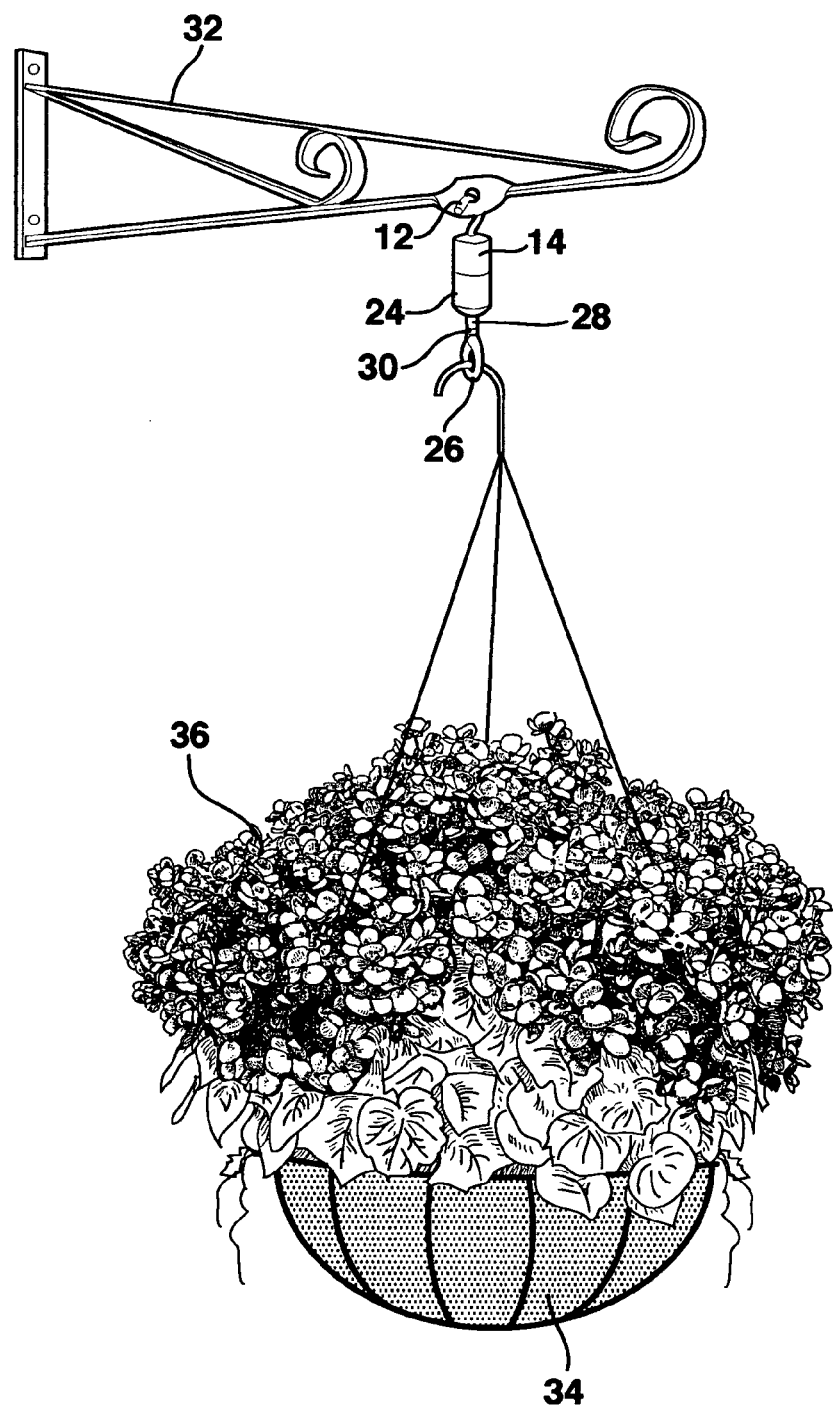
FIG. 1 is a perspective view of an embodiment of the invention in use with a properly watered plant in a hanging container.

In order that the invention may be clearly understood and readily carried into effect, Preferred embodiments of the invention will now be described, by way of example only and not to limit the invention, with reference to the accompanying drawings. FIG. 1 is a perspective view of the invention in use with a properly watered plant in a hanging container. When a consumer purchases and brings home a properly watered plant they usually have or create a specified place to hang the plant. Typically a consumer has installed hooks, brackets eyebolts or other hardware 32. The hardware 32 is used as a means to display the plants 36 potted in a hanging basket 34.

The soil moisture management device is shown in the Figures generally labeled 10. In a preferred embodiment, the soil moisture management device 10 includes a mounting hook 12, an upper housing 14, an upper lock nut 16, a cylindrical hollow central housing 18, a lower lock nut 20, a compression spring 22, a lower housing 24 and an eyebolt 26 preferably covered by a green indicator 28 and red indicator 30.

In FIG. 1 the mounting hook 12 is used to engage hardware 32 and an eyebolt 26 is used to engage hanging basket 34. The mounting hook 12 is typically a hook formed by bending an end of a metal rod into a hook shape. Although the mounting hook 12 is preferably formed by bending an end of a metal rod into a hook shape, the mounting hook 12 may be any mechanism capable of being connected, preferably removably, to the hardware 32. Examples of such alternate mounting hooks 12 include, but are not limited to a nut and bolt connection where a threaded end of the mounting hook 12 is passed through a hole or slot in the hardware 32 after which a nut is placed on the threaded end to hold the mounting hook 12 in position with respect to the hardware 32. Alternately, the mounting hook 12 may have an enlarged ultimate end and the hardware 32 may have a slot so that the mounting hook 12 may be passed through the slot in the hardware 32 where the enlarged ultimate end prevents the mounting hook 12 from passing through the slot in the hardware 32 so that the soil moisture management device 10 is removably attached to the hardware 32.

As stated, eyebolt 26 is used to engage hanging basket 34. Eyebolt 26 is typically a standard closed eyebolt but eyebolt 26 may be any mechanism capable of being able to support a hanging basket 34. Examples of such alternate eyebolts 26 include, but are not limited to a nut and bolt connection where a threaded end of the eyebolt 26 is passed through a hole or slot in a structure from which the hanging basket 34 is suspended after which a nut is placed on the threaded end to hold the eyebolt 26 in position with respect to the hanging basket 34. The construction of the soil moisture management device 10 is described in more detail below.

An upper housing 14 and a lower housing 24 joins mounting hook 12 with eyebolt 26. The "easy to see" green indicator 28 is fully extended in FIG. 1 fully notifying the plant's owner that the plant is adequately watered. The red indicator 30 is also visible in this view. The application of the green indicator 28 and red indicator 30 will be described more fully in connection with FIG. 2 hereafter.

Figure 2:
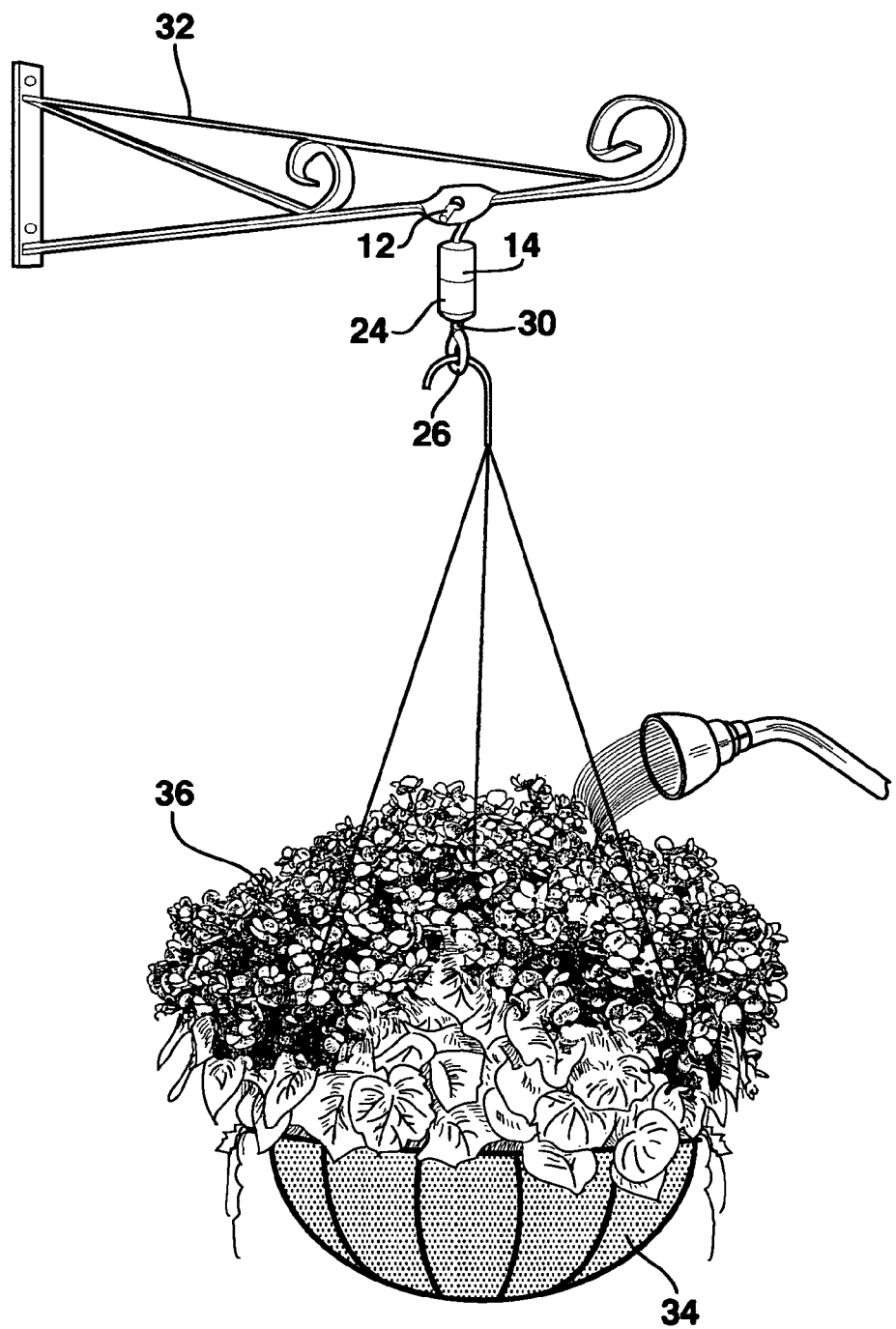
FIG. 2 is a perspective view of the embodiment of the invention of FIG. 1 in use with a plant in a hanging container needing to be watered.

FIG. 2 is a perspective view of the invention in use with a plant in a hanging basket 34 needing to be watered. It can be noted in this view, only the easy to see red indicator 30 is visible thus giving clearer notification to the owner of the plants 36 that the plants 36 are needing to be watered. As the plant is watered, the weight of the water in the soil in the hanging basket 34 increases the load on and consequently squeezes compression spring 22 until the green indicator 28 is fully exposed to view. At this point, the fully-exposed green indicator 28 indicates that the properly measured volume of water has been applied to the soil in the hanging basket 34 thereby indicating to the person watering the plant 36 that it is time to stop watering the plant 36 and that the plant 36 is accurately watered. Since a critical measurement to maintain the plants 36 health is soil moisture, this device and method of measuring soil moisture by weight is infallible and scientific.

Figure 3:
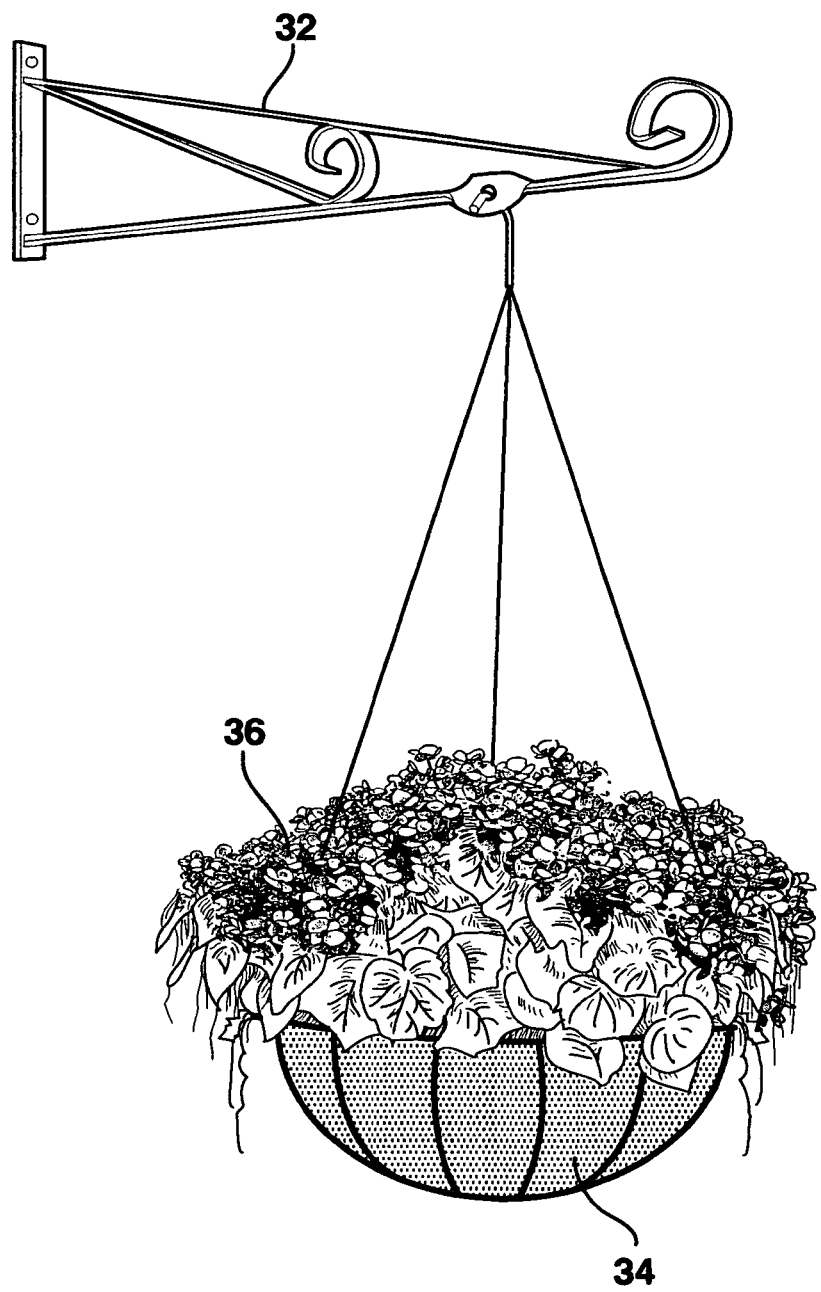
FIG. 3 is a perspective view of an unmonitored plant in a hanging container.

FIG. 3 is a perspective view of an unmonitored plant in a hanging basket 34. Without a measuring system in place, a plant's health is often compromised by over or under watering the plant 36 in the hanging basket 34. Without another plant to compare to, the stress of the plant due to the lack of proper soil moisture is often overlooked or mismanaged. Even if watered, but improperly watered, a homeowner can return home to find the stressed plant in a totally dead or nearly dead but unrecoverable condition.

Figure 4:
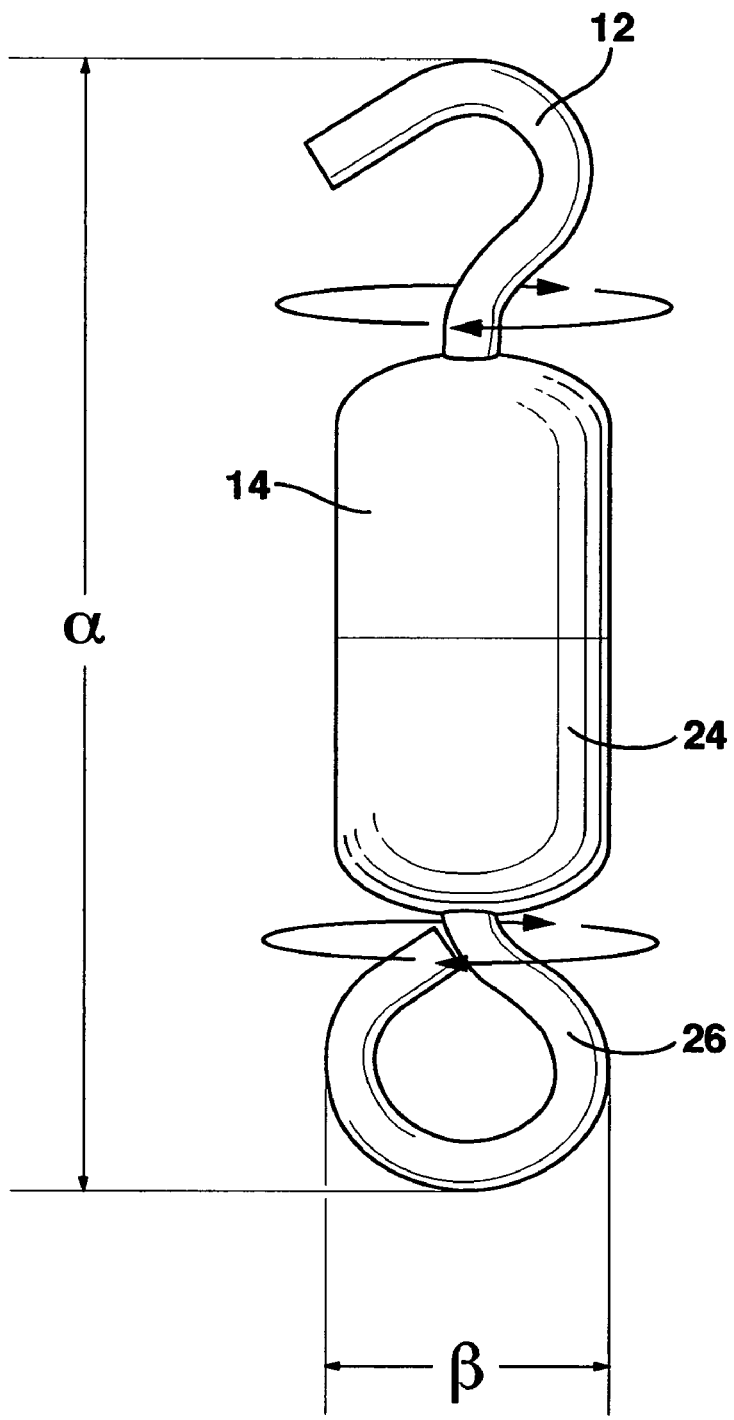
FIG. 4 is a front view of the embodiment of the invention shown in FIG. 1.

FIG. 4 is a front view of the device. Clearly shown are mounting hook 12 and eyebolt 26 connected by an upper housing 14 and a lower housing 24. Without a hanging basket 34 engaged in eyebolt 26, the green indicator 28 and red indicator 30 are fully retracted and concealed. Mounting hook 12 and eyebolt 26 each preferably have the ability to rotate 360° in two directions. This feature allows hanging basket 34 to be rotated in any direction at the touch of a finger so that anyone can quickly reposition the plant 36 to receive the most benefit from the sun (i.e., the plant 36 can be rotated to expose the plant 36 or various sides of the plant 36 to the light necessary for healthy plant life and growth) and be the most aesthetically pleasing to the eye of the viewer. In the preferred embodiment of the soil moisture management device 10, the length "$\alpha$" of the combined upper housing 14 and lower housing 24 is about 4.25 inches and the diameter "$\beta$" is about 1.125 inches. The range of $\alpha$ is typically about 2.125 to about 8.5 inches and the range of $\beta$ is typically about 0.5 to about 2.25 inches although the dimensions can be larger and smaller so long as the objectives of the invention are met.

Figure 5:
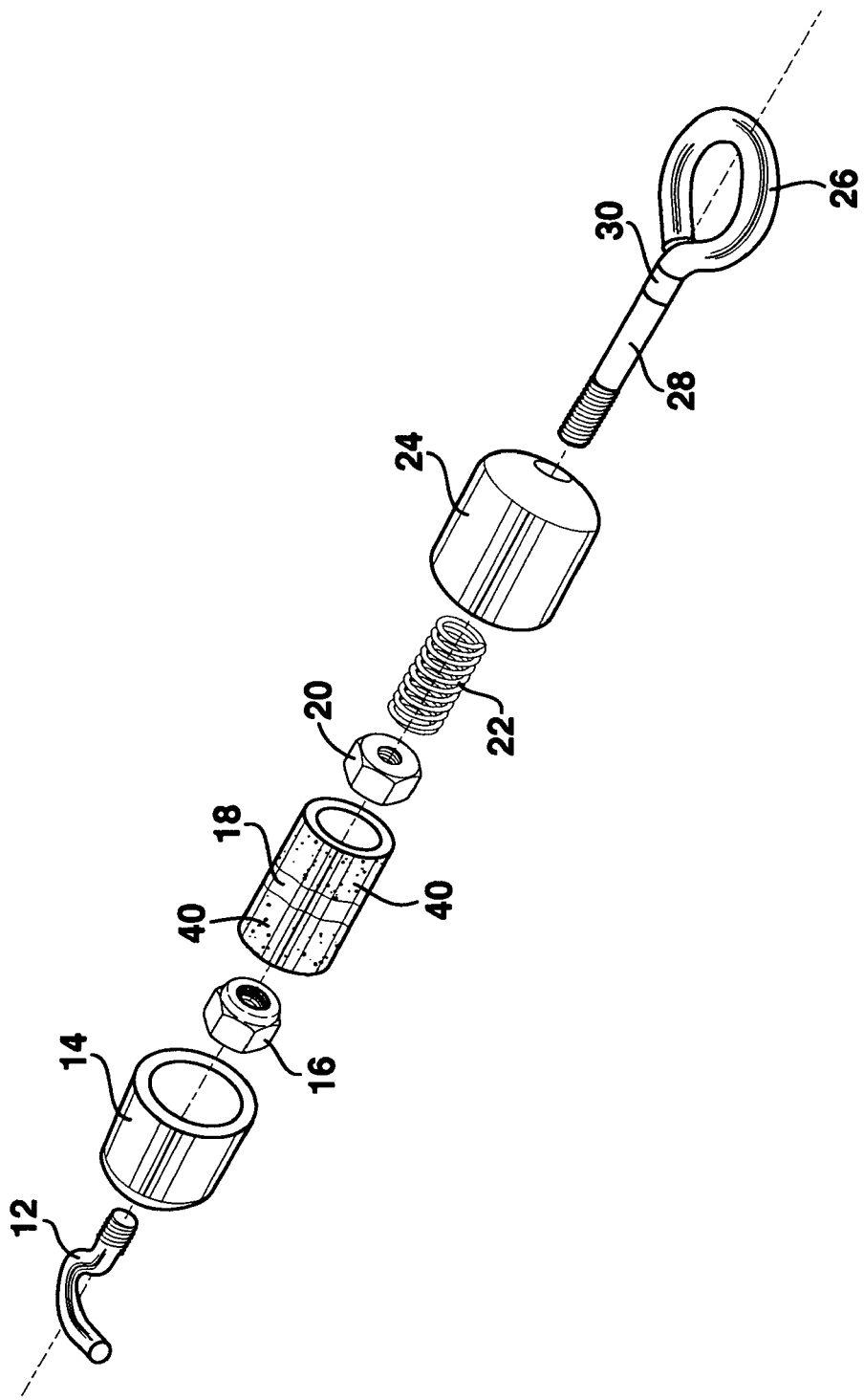
FIG. 5 is an exploded view of the embodiment of the invention shown in FIG. 1.

FIG. 5 is an exploded view of the soil moisture management device 10. The parts are manufactured and assembled according to the following method. Mounting hook 12 preferably has a threaded end that is inserted through an opening in the upper housing 14. Upper lock nut 16 is fastened to mounting hook 12 inside the upper housing 14 by threading the upper locking nut 16 along the threaded portion of the mounting hook 12. This retains the mounting hook 12 with respect to the upper housing 14.

Central housing 18 binds the upper housing 14 to the lower housing 24 with portions of the mounting hook 12 and eyebolt 26 contained within its hollow center. The outer diameter of the central housing 18 is about the same as the interior diameter of the upper housing 14 and lower housing 24. To connect the upper housing 14 to the lower housing 24, central housing 18 is externally covered with a bonding adhesive 40 and inserted into upper housing 14, thus binding the exterior of the central housing 18 to the inside of the upper housing 14.

Eyebolt 26 is preferably covered by green metalized mylar to produce the green indicator 28 and by red metalized mylar to produce the red indicator 30. As explained herein, the green and red indicators 28, 30 correspond to amounts of water in the soil of the plants 36 in the hanging basket 34. Although these indicators 28 and 30 have been described as being made of mylar, they may be made of any material including, but not limited to, paint, anodized coating or may not be colored at all but merely have numeric indicators or text or have colors other than red and green to indicate the various states or moisture content of the soil in the hanging baskets 34. Preferably, the green and red indicators 28, 30 are luminous in order to be more able to be seen by the user of the plant soil moisture management device 10. In a preferred embodiment, the metalized mylar, both red and green, is adhesive backed and wrapped in a cylindrical fashion about the shaft of eyebolt 26, above the threads.

The function of the indicators 28, 30 is to indicate the amounts of moisture in soil in the hanging basket 34. The preferred number of such indicators is two, a green indicator 28 and a red indicator 30. But, as described herein, the amount of each such indicator 28, visible outside the lower housing 24 varies as the amount of moisture in the soil varies. Consequently, where there are two indicators 28, 30, the amount of such indicators visible outside the lower housing 24 varies across a spectrum from all of the green indicator 28 and all of the red indicator 30 when there is a maximum amount of moisture in the soil to only all of the red indicator 30 visible when the moisture content is at a critical level indicating that the plant 36 is in immediate need of water. Because this critical level is not the point where the soil is completely free of moisture, as the soil continues to lose moisture, less and less of the red indicator 30 will be visible.

As can be seen, positions on the first end of the eyebolt 26 visible outside the lower housing 24 correspond to amounts of moisture in the soil. It may be desirable to have more than two indicators. For example, it may be desirable to have a green indicator 28, a red indicator 30 and a yellow indicator located between the green indicator 28 and the red indicator 30 to indicate a state of imminent need for adding moisture to the soil before the critical moisture level is reached. It is clear that an almost limitless number of colors could be placed on the first end of the eyebolt 26 as for example, by placing a spectrum on the first end of the eyebolt 26.

Further, it may be desirable to have only one color visible as an indicator on the first end of the eyebolt. For example, it may be desirable to only place a red indicator 30 on the first end of the eyebolt so that when only the red indicator 30 is visible, the moisture content in the soil has reached a critical level. Alternately, it may be desirable to only place a green indicator 28 on the first end of the eyebolt 26 so that when the green indicator 28 is no longer visible, the moisture content of the soil has reached a critical level.

As mentioned, it is also possible to place text on the first end of the eyebolt 26, wither with or without additional colors as described above, indicating the state of the moisture in the soil. For example, the words "moist" and "dry" or similar words may be placed on the first end of the eyebolt 26 corresponding to the location of the green indicator 28 and red indicator 30, respectively, described above. Also, a metric such as a series of numbers or alphabet letters may be added to the first end of the eyebolt 26 so that a certain number or letter being no longer visible indicates that a state of moisture content (e.g., critical level, imminent level) is reached. Other visual indicators such as a picture of a healthy plant and a picture of a withered plant corresponding to the locations of the green indicator 28 and the red indicator 30 described above may also be used singly or in combination with the other indicators. As can be seen, virtually unlimited types, permutations and combinations of these and other visual indicators may be used so long as ultimately, a user is able to tell by looking at the first end of the eyebolt 26 the moisture content of the soil as determined by the soil moisture management device 10.

Eyebolt 26 also is preferably threaded on one end. The threaded end of the eyebolt 26 is inserted through an opening in the lower housing 24. Compression spring 22 is inserted on eyebolt 26 over the threaded end and fastened on the eyebolt 26 by a lower lock nut 20 that is threaded onto the threaded end of the eyebolt 26. Central housing 18 is then externally covered with a bonding adhesive 40 and connected into lower housing 24 so that the exterior surface of the central housing is bonded to the interior surface of the lower housing 24. At this point, the central housing connects the upper housing 14 and lower housing 24 into an integrated unit as shown in cross-section in FIG. 6. Although the upper housing 14, central housing 18 and lower housing 24 have been described as being connected to bonding adhesive 40, any other means of connecting these components may be used as will occur to those skilled in the art including, but not limited to, mechanical connection, friction fit and ultrasonic welding.

Figures 6, 7:
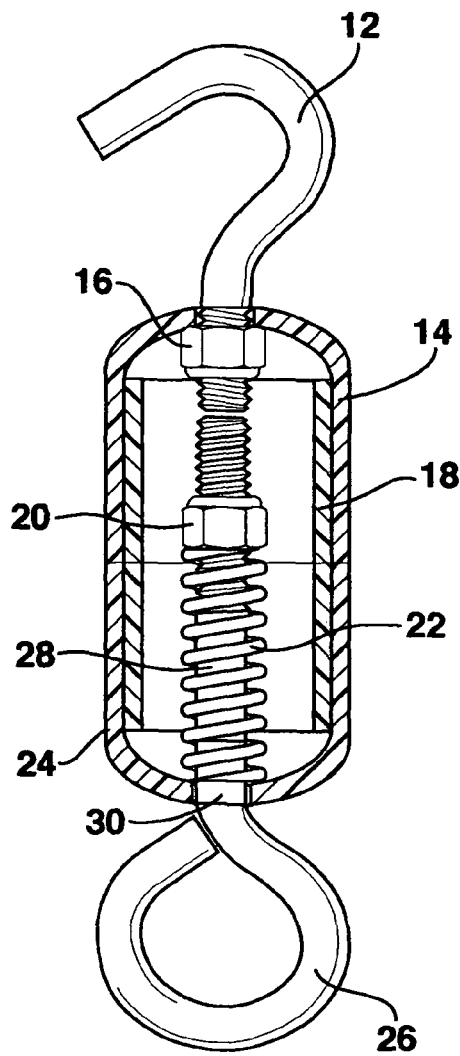
FIG. 6 is a sectional view of the invention of FIG. 1.
FIG. 7 is a chart of compression spring characteristics.

FIG. 6 is a sectional view of FIG. 4. In use, the soil moisture management device 10 is attached to the hardware 32 by hooking the upper hook 12 through a hole or slot in the hardware 12. Without a load from a hanging basket 34 attached to the soil moisture management device 10, the compression spring 22 is in a fully uncompressed mode, completely concealing green luminous indicator 28 and red luminous indicator 30 from external view. When a hanging basket 34 with plants 36 is attached to the eyebolt 26, the weight of the hanging basket 34, plants 36, soil and water, in varying amounts, pulls the eyebolt 26 against the compression spring 22 thus exposing first the red luminous indicator 30 and then the green luminous indicator 28 depending on the weight of the hanging basket 34, plants 36 and water; the more water the more weight and consequently the more of the eyebolt 26 will be exposed.

It is to be noted that in the commercial gardening industry today, hanging baskets 34 and containers are typically manufactured in the following sizes, 10 inch, 11 inch, 12 inch, 14 inch, 14 inch fiber and 16 inch moss. To present the invention, and accommodate the hanging baskets 34 and containers available in the commercial gardening industry today, the compression spring 22 is typically presented in two sizes, light and heavy duty. FIG. 7 is a chart of typical compression spring 22 characteristics. FIG. 7 also illustrates the relationships of wet and dry soil conditions to the light and heavy duty compression spring 22. In this way, the soil moisture management device 10 with the appropriate compression spring 22 is matched to the hanging basket 34 and plant 36.

Figure 8:
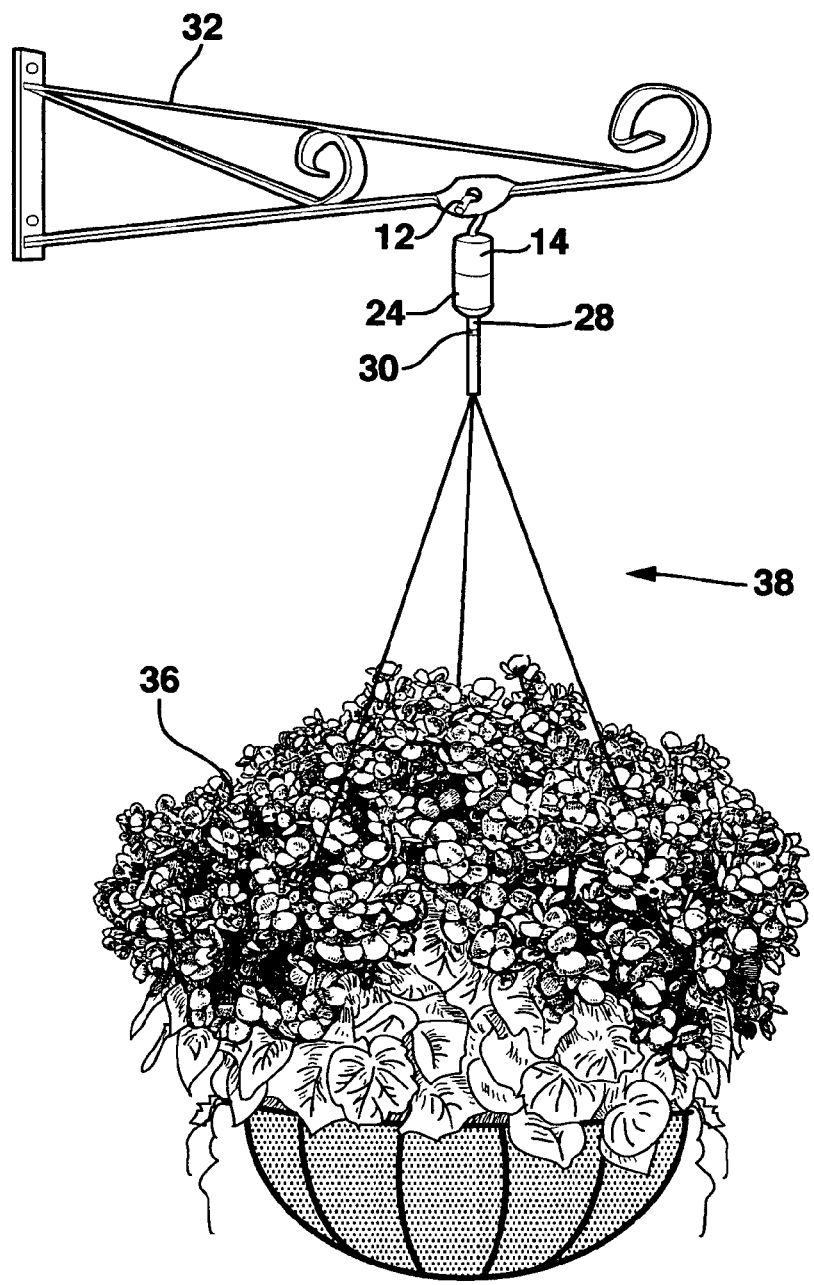
FIG. 8 is an alternate embodiment of the invention.

FIG. 8 is an alternate embodiment of the soil moisture management device 10. In this alternate embodiment, the eyebolt 26 is modified so that the hanging basket 34 is integrally connected to the eyebolt 26. In this embodiment, the soil moisture management device 10 and the hanging basket 34 are a single device.

Figure 9:
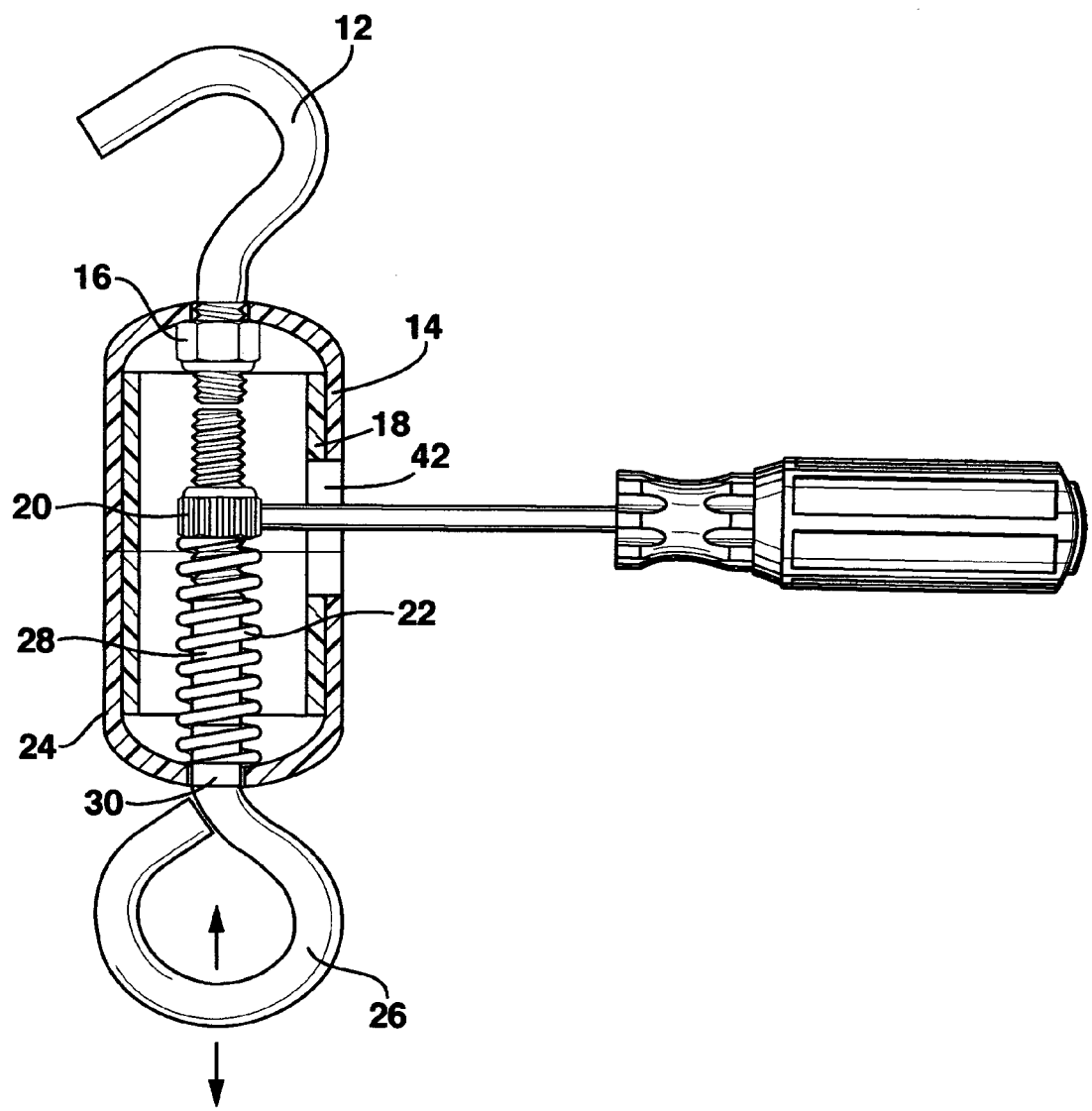
FIG. 9 is an alternate embodiment of the invention.

FIG. 9 is another alternate embodiment of the soil moisture management device 10. In this embodiment, the locking nut 20 is modified so that instead of having flat sides as is typical for nuts, the locking nut 20 has an outer configuration that is slotted such as would be presented by a gear-like crenellated outer surface. Also in this embodiment, the upper housing 14, central housing 18 and lower housing 24 are modified to include a substantially vertical slot 42 that extends from outside the soil moisture management device 10 to inside the central housing 18 so that the modified locking nut 20 is accessible through the vertical slot 42. A device, such as a screwdriver, is passed through the vertical slot 42 where it interacts with the modified locking nut 20 to move the locking nut 20 along the threaded portion of the eyebolt 26 by rotating the modified locking nut 20 for a purpose to be explained hereafter.

In this embodiment, the upper hook 12 is attached to the hardware 32 so that the soil moisture management device 10 hangs down from the hardware 32. A hanging basket 34 containing a plant 36 in soil is attached to the eyebolt 26. Because the hanging basket 34, plant 36 and soil have weight and because the soil contains a certain amount of water, the combination of the hanging basket 34, plant 36, soil and water in the soil will cause the eyebolt 26 to be pulled downward against the bias of the compression spring 22.

In this embodiment, water is added to the soil until the desired moisture content is achieved. It is expected that there will be some variability in the weight of each of the hanging basket 34, plant 36, soil and water so that there will be variability in the combined weight of various combinations of these components. At this time, the combination hanging basket 34, plant 36, soil and water will have the maximum weight so that the eyebolt 26 will be pulled downward its maximum distance.

Because of the variability of various combinations of the weights of the hanging basket 34, plant 36, soil and water, various amounts of the green luminous indicator 28 and red luminous indicator 30 will be exposed. The embodiment of FIG. 9 allows the amount of the green luminous indicator 28 and red luminous indicator 30 showing to be calibrated to the variable weights of respective combinations of hanging baskets 34, plant 36, soil and water. This may help to more accurately determine the moisture content of the soil, particularly with unusual plants or unusually large or small plants, and thus alert the plant's owner to the need to add more water to the soil.

Once the soil moisture management device 10 has been attached to the hardware 32 and a hanging basket 34, with a plant 36, soil and whatever moisture is present in the soil is attached to the eyebolt 26, water is added to the soil to bring the soil moisture content to a desired amount. At this time, the location of the modified locking nut 20 is moved up or down the threaded portion of the eyebolt 26 to expose the entire length of the green luminous indicator 28 and red luminous indicator 30. The modified locking nut 20 is moved up or down the threaded portion of the eyebolt 26 by the interaction, through the vertical slot 42, of a device, such as a screwdriver, with the crenellated outer surface of the modified locking nut 20. Then, as moisture leaves the soil and the combined weight of the hanging basket 34, plant 36, and water decreases, the eyebolt 26 will move upward against the bias of the compression spring 22 to a point where only the red luminous indicator 30 is showing outside the lower housing 24. At this point, the plant owner is alerted to the need to add water to the soil to bring the soil moisture content to the desired level.

The mounting hook 12 and eyebolt 26 are preferably made of a strong metal such as steel although any material may be used, including but not limited to, other metals and plastics. The upper housing 14, central housing 18 and lower housing 24 are preferably made of a strong and durable plastic although they may be made of metal or ceramics. The upper lock nut 16 and lower lock nut 20 are of the type typical for mating with the threading on the mounting hook 12 and eyebolt 26, respectively. The compression coil 22 is preferably a coil spring made of a material such as spring steel.

As described above, the second end of the mounting hook 12 is retained within the central housing 18 by the interaction between the threaded second end of the mounting hook 12 and locking nut 16. However, other methods of retaining the second end of the mounting hook 12 may be used including, but not limited to, a screw, bolt or cotter pin passing through a hole formed substantially perpendicularly through the second end of the mounting hook 12. In this alternate method of retaining the mounting hook 12 within the central housing 18, the hole formed substantially through the second end of the mounting hook 12 may be threaded to match the threads of the screw or bolt.

In addition, as described above, the second end of the eyebolt 26 is retained within the central housing 18 by the interaction between the threaded second end of the eyebolt 26 and locking nut 20. However, other methods of retaining the second end of the eyebolt 26 may be used including, but not limited to, a screw, bolt or cotter pin passing through a hole formed substantially perpendicularly through the second end of the eyebolt 26. In this alternate method of retaining the eyebolt 26 within the central housing 18, the hole formed substantially through the second end of the eyebolt 26 may be threaded to match the threads of the screw or bolt.

The present invention includes a method of regulating the moisture content of soil in hanging basket 34 where the hanging basket 34 contains soil, a plant 36 and a variable amount of moisture in the soil. The method comprises: providing an eyebolt 26 that supports the hanging basket 34, soil, plant 36 and moisture where the eyebolt 26 is capable of moving against a bias against the gravitational pull on the hanging basket 34, soil, plant 36 and variable amount of moisture; and visually indicating the position of the eyebolt 26 against the bias so that a first amount of moisture in the soil produces a first position of the eyebolt 26 and a second amount of moisture produces a second position of the eyebolt 26.

Because of the nesting nature of the upper housing, 14, lower housing 24 and central housing 18, with parts of the upper hook 12 and eyebolt 26 contained within the central housing 18, the soil moisture management device 10 is small and compact in size. The design and construction of the soil moisture management device 10 produces a robust and strong device that is simple, easy to manufacture and use and safe. The simplicity and design of the soil moisture management device 10 along with relatively minimal movement of the parts of the soil moisture management device 10 also provides a device with longevity free from mechanical breakdown. The design and construction of the soil moisture management device 10 also produces a device that is visually attractive to the eye and includes indicators that can be clearly observed and read. The capability of providing various compression springs 22 to correspond to differing hanging baskets 34 and plants 36 produces a device that accommodates a wide variety or commercially produced hanging baskets 34 and commercially available plants 36. The ability of the upper hook 12 and eyebolt 26 to rotate also allow the plant 36 to be rotated into positions to facilitate watering and more attractively visually present the plant 36.

In operation, the soil moisture management device 10 provides a device that easily helps the plant owner maintain the health of a potted plant 36 in a hanging basket 34.

From the description above, a number of advantages of embodiments of my healthy soil moisture management device and method become evident:

There are many materials and configurations that can be used in constructing the invention by those skilled in the art including various materials, methods and dimensions. In addition, it is clear that an almost infinite number of minor variations to the form and function of the disclosed invention could be made and also still be within the scope of the invention. Consequently, it is not intended that the invention be limited to the specific embodiments and variants of the invention disclosed. It is to be further understood that changes and modifications to the descriptions given herein will occur to those skilled in the art. Therefore, the scope of the invention should be limited only by the scope of the claims.

I claim:

1. A soil moisture management device comprising:
   (a) a housing attached at one end to hardware for supporting the device and a hanging basket containing a plant in soil and moisture in varying amounts in the soil; and
   (b) a moving member that is biased by a spring against the gravitational pull on the hanging basket, plant, soil and moisture, the spring and a portion of the moving member contained in the housing, wherein the moving member having at least one visual indicator of the position of the moving member against the bias provided by the spring to indicate the amount of moisture in the soil, and wherein the moving member is integrally connected to a hanging basket so that the soil moisture management device and the hanging basket are a single device.

2. The soil moisture management device of claim 1 wherein the at least one visual indicator of position of the moving member comprises at least one color indicator.

3. The soil moisture management device of claim 2 wherein the at least one visual indicator of position of the moving member comprises a green indicator and a red indicator.

4. The soil moisture management device of claim 1 wherein the housing includes a mounting hook that connects the housing to the hardware.

5. The soil moisture management device of claim 4 further comprising means for retaining an end of the mounting hook within the housing to prevent the end of the mounting hook from exiting the housing through an opening in the housing.

6. The soil moisture management device of claim 5 wherein the means for retaining an end of the mounting hook comprises: (a) the end of the mounting hook being threaded; and (b) an upper lock nut placed on the threaded end of the mounting hook to prevent the threaded end of the mounting hook from exiting the housing through the opening in the housing.

7. The soil moisture management device of claim 5 wherein the means for retaining an end of the mounting hook comprises: (a) the end of the mounting hook having a hole formed substantially perpendicularly through an end of the mounting hook; and (b) a fastening mechanism chosen from the group consisting of a screw, bolt or cotter pin, the fastening mechanism passing through the hole formed substantially perpendicularly through the end of the mounting hook.

8. The soil moisture management device of claim 7 wherein the end of the mounting hook having a hole formed substantially perpendicularly through the end of the mounting hook is threaded to match the threads of the screw or bolt.

9. The soil moisture management device of claim 1 wherein the mounting hook swivels 360° with respect to the housing.

10. The soil moisture management device of claim 1 wherein the housing includes an upper housing, lower housing and a central housing, the upper housing being substantially cylindrical and hollow and having a closed end, the upper housing having an outer diameter and an inner diameter; the lower housing being substantially cylindrical and hollow and having a closed end and an opening through a the closed end through which a portion of the moving member passes, the lower housing having an outer diameter and an inner diameter; the central housing being substantially cylindrical and hollow and having an outer diameter and an inner diameter, the outer diameter being approximately equal to the inner diameter of the upper housing and lower housing, the central housing attached to the upper housing and lower housing so that a portion of the central housing is in physical contact with a portion of the inner surface of both the upper and lower housings, the central housing being attached to the upper housing and lower housing so that an integral unit is formed between the upper housing and lower housing through the central housing.

11. The soil moisture management device of claim 10 wherein the length of the integral unit formed between the upper housing and lower housing through the central housing is between about 2.125 to about 8.5 inches.

12. The soil moisture management device of claim 11 wherein the length of the integral unit formed between the upper housing and lower housing through the central housing is more particularly about 4.25 inches.

13. The soil moisture management device of claim 10 wherein the diameter of the integral unit formed between the upper housing and lower housing through the central housing is between about 0.5 to about 2.25 inches.

14. The soil moisture management device of claim 13 wherein the diameter of the integral unit formed between the upper housing and lower housing through the central housing is more particularly about 1.125 inches.

15. The soil moisture management device of claim 1 wherein the moving member is an eyebolt.

16. The soil moisture management device of claim 1 wherein the spring is placed over the portion of the moving member and wherein the spring and a portion of the moving member is located within the housing.

17. The soil moisture management device of claim 16 further comprising means for retaining a portion of the moving member within the housing.

18. The soil moisture management device of claim 17 wherein the means for retaining a portion of the moving member within the housing comprises (a) an end of the moving member being threaded; and (b) an lower lock nut placed on the threaded end of the moving member to prevent the threaded end of the moving member from exiting the housing through an opening in the housing.

19. The soil moisture management device of claim 18 wherein: (a) the lower lock nut has a slotted outer configuration; and (b) the housing includes a substantially vertical slot that extends from outside the soil moisture management device to inside the housing so that the locking nut having a slotted outer configuration is accessible through the vertical slot.

20. The soil moisture management device of claim 17 wherein the means for retaining a portion of the moving member within the housing comprises (a) an end of the moving member having a hole formed substantially perpendicularly through the second end of the moving member; and (b) a fastening mechanism chosen from the group consisting of a screw, bolt or cotter pin, the fastening mechanism passing through the hole formed substantially perpendicularly through the end of the moving member.

21. The soil moisture management device of claim 20 wherein the end of the moving member having a hole formed substantially perpendicularly through the end of the mounting member is threaded to match the threads of the screw or bolt.

22. The soil moisture management device of claim 1 wherein the moving member swivels 360° with respect to the housing.

23. A soil moisture management device comprising: (a) a mounting hook having a first and a second end, the first end formed in a hook shape; (b) a substantially cylindrical, hollow upper housing having a closed end and an opening through the closed end through which the second end of the mounting hook passes, the upper housing having an outer diameter and an inner diameter; (c) an eyebolt having a first end and a second end, the first end having at least one visual indicator of position along the length of the first end; (d) a substantially cylindrical, hollow lower housing having a closed end and an opening through the closed end which the first end of the eyebolt passes, the lower housing having an outer diameter and an inner diameter; (e) a substantially cylindrical hollow central housing having an outer diameter and an inner diameter, the outer diameter being approximately equal to the inner diameter of the upper housing and lower housing, the central housing attached to the upper housing and lower housing so that a portion of the central housing is in physical contact with a portion of the inner surface of both the upper and lower housings, the central housing attached to the upper housing and lower housing so that an integral unit is formed between the upper housing and lower housing through the central housing; (f) means for retaining the second end of the mounting hook within the upper housing or central housing to prevent the second end of the mounting hook from exiting the upper housing through the opening in the upper housing; (g) a compression spring having a first end and a second end, the compression spring placed over the second end of the eyebolt when the second end of eyebolt is placed through the opening in the closed end of the lower housing, the first end of the compression spring coming into contact with the closed end of the lower housing, the compression spring biasing the eyebolt against movement of the eyebolt in a direction from the second end of the eyebolt toward the first end of the eyebolt; (h) means for retaining the second end of the eyebolt within the central housing and the compression spring placed over the second end of the eyebolt.

24. A soil moisture management device comprising:
(a) a housing attached at one end to hardware for supporting the device and a hanging basket containing a plant in soil and moisture in varying amounts in the soil;
(b) a moving member that is biased by a spring against the gravitational pull on the hanging basket, plant, soil and moisture, the spring and a portion of the moving member contained in the housing, wherein the moving member having at least one visual indicator of the position of the moving member against the bias provided by the spring to indicate the amount of moisture in the soil, and wherein the spring is placed over the portion of the moving member and wherein the spring and a portion of the moving member is located within the housing; and
means for retaining a portion of the moving member within the housing, wherein the means for retaining a portion of the moving member within the housing comprises (a) an end of the moving member being threaded; and (b) an lower lock nut placed on the threaded end of the moving member to prevent the threaded end of the moving member from exiting the housing through an opening in the housing, and wherein (a) the lower lock nut has a slotted outer configuration; and (b) the housing includes a substantially vertical slot that extends from outside the soil moisture management device to inside the housing so that the locking nut having a slotted outer configuration is accessible through the vertical slot.

* * * * *